United States Patent
Matnick

[19]

[11] Patent Number: 6,056,034
[45] Date of Patent: May 2, 2000

[54] DIFFICULT TO MOUNT TIRE CHANGER AND METHOD FOR HANDLING THEREOF

[76] Inventor: Michael Matnick, 80 Pauls Path, Coram, N.Y. 11727

[21] Appl. No.: 09/082,175

[22] Filed: May 20, 1998

[51] Int. Cl.[7] ................................................ B60C 25/135
[52] U.S. Cl. ...................................... 157/1.24; 157/1.17
[58] Field of Search ............................. 157/1, 1.17, 1.24

[56] References Cited

U.S. PATENT DOCUMENTS

| | | |
|---|---|---|
| D. 269,879 | 7/1983 | Holladay et al. . |
| D. 293,916 | 1/1988 | Cunningham et al. . |
| 3,746,069 | 7/1973 | Blomgren, Sr. et al. . |
| 4,196,766 | 4/1980 | Leeper et al. . |
| 4,245,686 | 1/1981 | Holladay . |
| 4,324,282 | 4/1982 | Leeper . |
| 4,327,794 | 5/1982 | Leeper et al. . |
| 4,393,914 | 7/1983 | Leeper . |
| 4,417,614 | 11/1983 | Cunningham et al. . |
| 4,606,393 | 8/1986 | Cuccolini . |
| 4,615,370 | 10/1986 | Cuccolini . |
| 4,830,079 | 5/1989 | Onuma .................................. 157/1.24 |
| 4,986,328 | 1/1991 | Metzger ................................ 157/1.24 |
| 5,219,012 | 6/1993 | Corghi . |
| 5,339,880 | 8/1994 | Kawabe et al. ................... 157/1.24 X |
| 5,381,843 | 1/1995 | Corghi . |
| 5,472,034 | 12/1995 | Corghi .................................. 157/1.24 |

FOREIGN PATENT DOCUMENTS

| 417373 | 7/1966 | Switzerland ........................ 157/1.24 |
|---|---|---|

*Primary Examiner*—James G. Smith
*Attorney, Agent, or Firm*—Hedman, Gibson & Costigan, P.C.

[57] ABSTRACT

An easy to use retrofit apparatus or OEM machine difficult to mount tire changer for use in tire mounting and demounting operations and bead loosening operations which eliminates damage to tire sidewalls and the rim of wheels.

17 Claims, 5 Drawing Sheets

DIFFICULT TO MOUNT TIRE CHANGER AND METHOD FOR HANDLING THEREOF

FIELD OF THE INVENTION

The present invention relates to a machine and method for use in mounting, demounting, and bead loosening operations in difficult to mount tires.

BACKGROUND OF THE INVENTION

Over the years, there has been an increase in the varieties of vehicle tires with the consequence that a tire changing machine must be increasingly versatile in terms of its ability to handle a large variety of differing wheel sizes, wheel types, tire sizes and tire types.

In many instances, a typical service station or vehicle repair shop does not have the financial resources in its day-to-day business to justify the capital expense of a highly sophisticated tire changing apparatus, such as where a new or separate machine is required for different types of difficult to mount tires (i.e., extremely low-profile tires, or the increasingly popular "run-flat", "zero pressure" or extended mobility type tires). In particular, these difficult to mount tires alter the needs of tire changing machines because, unlike conventional tires, difficult to mount tires usually have extremely stiff side walls, which although useful for driving on a tire after a flat has been incurred, the inherent rigidity of the sidewalls of these tires interferes with the normal course of tire mounting and demounting operations as well as bead loosening operations, all of which depend on flexibility of sidewall movement. In addition, the mounting operation must be carried out without damaging the polished or coated rim surfaces of steel or alloy wheels.

Present tire changing devices, such as those described in U.S. Pat. Nos. 4,196,766, 4,417,614, and 4,393,914, the specifications of which are hereby incorporated by reference, are usually incapable of mounting or loosening the bead of such difficult to mount tires, except in certain cases where several workmen are used to apply simultaneous pressure to the side walls of the difficult to mount tires. Even with such an inefficient worker configuration, the results obtained are generally less than satisfactory. Nevertheless, certain tire changing apparatuses are known which may be used to operate on certain difficult to mount tires, however, these prior art devices tend to be extremely expensive, and more importantly, the inferior design of these machines has the potential to damage the polished finish of the rims of wheels and the sidewalls of difficult to mount tires.

In this regard, there is a real need for a relatively inexpensive tire changing machine or retrofit attachment which will provide, in addition to standard tire changing capabilities, the capability to easily change difficult to mount tires without damage to sidewalls or rims.

SUMMARY OF THE INVENTION

The present invention relates to a difficult to mount tire changing machine for use in mounting and demounting difficult to mount tires on wheels. The tire changing apparatus includes a swing arm style tire changer having a base, an upright stem, a swing arm, a tool assembly and a means for rotating the difficult to mount tires on wheels. Included on the tool assembly is a difficult to mount tire changing device. The difficult to mount tire changing device utilizes a force means to apply a force to a side wall of a given difficult to mount tire via a roller mounted on a shaft which extends from the force means included in the difficult to mount tire changing device. The extension of the shaft and appurtenant roller is effected by the force means, all of which is controlled by an operator via an operation control means.

Accordingly, it is an object of the present invention to provide a new and improved difficult to mount tire changing machine or retrofit machine and method for use thereof. Thus, the present invention contemplates two particular embodiments, collectively referred to as difficult to mount tire changer(s). More specifically, it is an object of the invention to provide a difficult to mount tire changer and method which does not have the potential to damage the side walls of difficult to mount tires or the rim of the wheel on which the difficult to mount tire is mounted.

It is another object of the present invention to provide a specially designed run-flat tire changer which may exist as an stand-alone, OEM type swing arm style tire machine, or according to another embodiment which the present invention also contemplates, an easy to install retrofit attachment for conversion of existing tire machines in the form of an adapter for swing arm style tire changers.

Accordingly, the present invention provides an inexpensive stand-alone OEM swing arm style tire changing machine and method, and alternatively, for those who wish to avoid the wholesale replacement of their present swing arm style tire changing machines, the present invention also provides an easy to install retrofit apparatus and method for processing difficult to mount tires for use on present swing arm style tire machines.

Other objects and advantages will become apparent from the following specification taken in connection with the accompanying drawings.

DETAILED DESCRIPTION OF THE PRESENT INVENTION AND DESCRIPTION OF THE PREFERRED EMBODIMENTS

Figure 1:
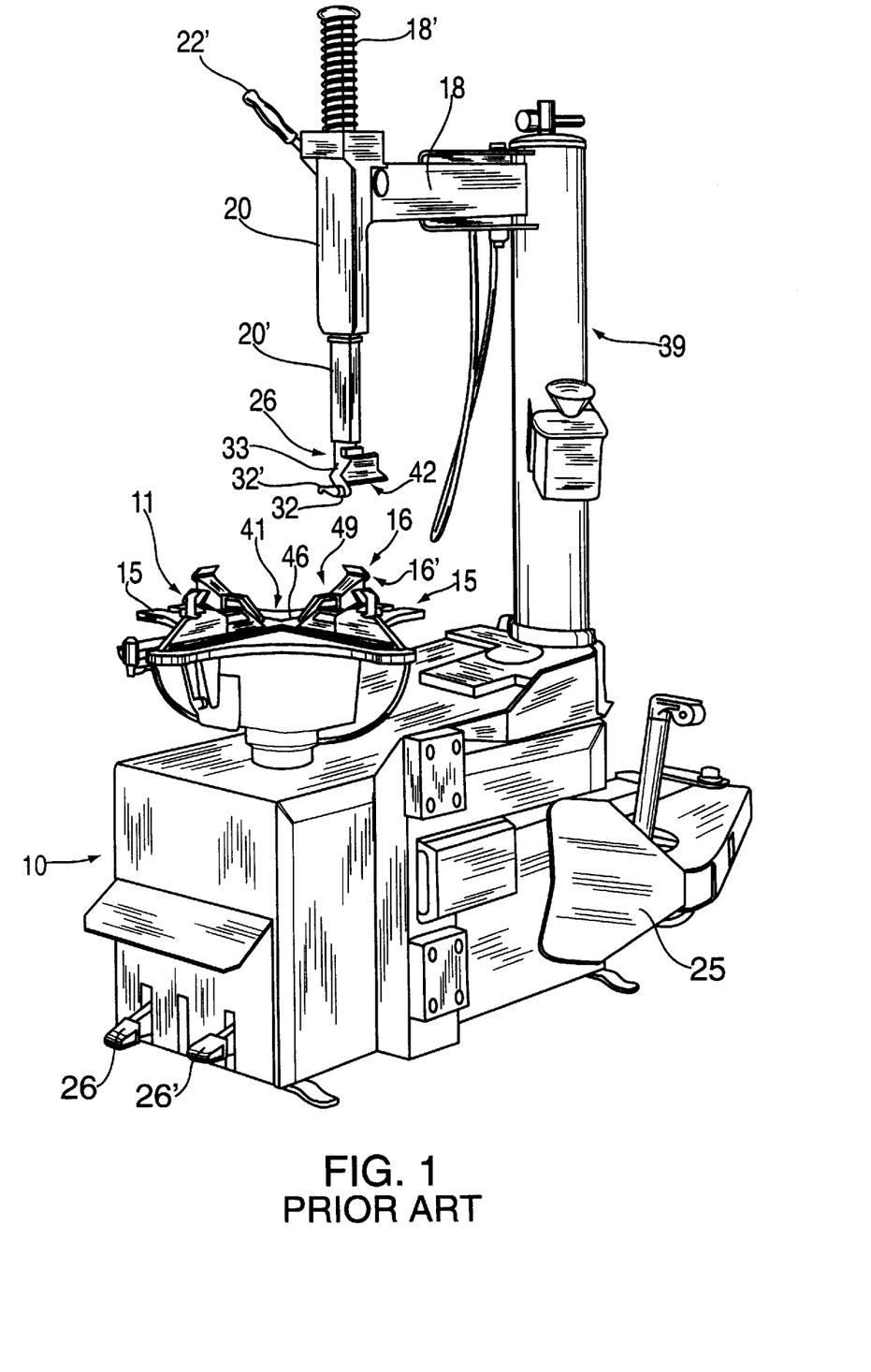
FIG. 1 is an offset frontal perspective view of a swing arm style tire changer machine in the prior art.

Reference now is made to the offset frontal perspective view of a prior art swing arm style tire changing machine in the prior art depicted in FIG. 1. The prior art swing arm style tire changing machine includes a base 10, supported by an underlying surface, and at its extremity, reciprocally receives an elongated upright stem 39. Rotatively attached to upright stem 39 is swing arm 18. Attached to swing arm 18 is tool assembly 20. Suitable horizontal clamping means (not shown) may be utilized to hold the tool assembly 20 in any desired position of horizontal adjustment. A handle locking means 22' operates an internal vertical locking means (not shown) to lock tool assembly 20 in any desired vertical position. Also, a clamping means lever (not shown) is connected to a horizontal clamping means (not shown) to allow swing arm 18 to provide adjustment of tool assembly 20 towards and away from the center of the table in the horizontal direction in order to compensate for various wheel sizes. The general changer described thus far is conventional and may be readily ascertained from the prior art. A pressure gauge is also provided to monitor the pressure in the system.

As further seen in FIG. 1, the tool assembly 20 is connected to upright stem 39 by rotative mounting of swing arm 18 at the upper end of upright stem 39. A tire engaging head 26 is connected to the lower end of an inner shaft 20' of tool assembly 20 such that inner shaft 20' is vertically adjustable by pulling handle 22'. Spring means 18' provides an upward bias to shaft 20' when handle 22' is pulled. The tire engaging head 26 may be formed of a metal casting or the like, but the precise configuration of the tire engaging head 26 actually forms no particular part of the invention as a variety of differing head configurations are well known in the art. However, by way of example, the head 26 will have a surface 32 for engagement of the bead of a tire during mounting or demounting operations. A surface 32' is positioned so that it extends up to a rim flange of a wheel toward the center (not pictured) of a given wheel, while the second part 32 will typically be spaced further away from the wheel 34. The second part 42, by reason of its facing a wheel, is the side most apt to abrade a decorative or polished surface on a wheel as will be readily recognized by those skilled in the art. Accordingly, the same is preferably provided with an abrasion-eliminating means as is currently known in the art.

Figure 6:
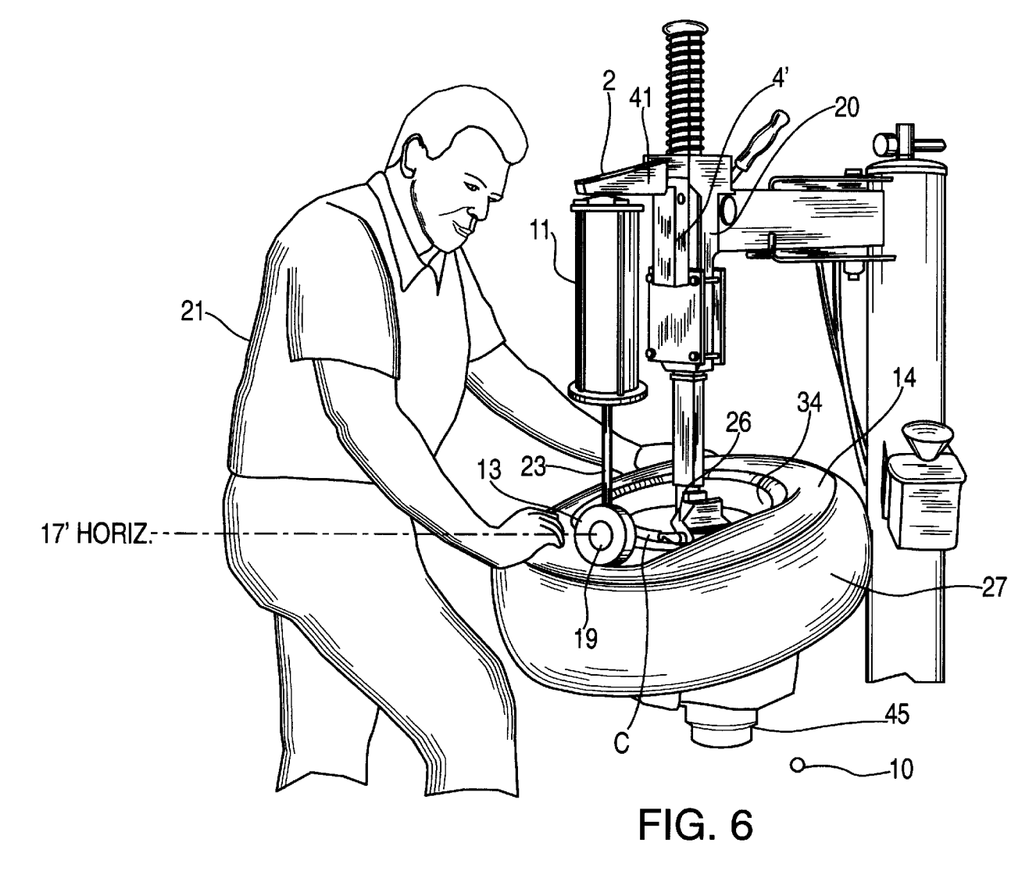
FIG. 6 is an offset side perspective of the complete difficult to mount tire changer and method of using therewith.

Base 10 further comprises a table 41 for supporting a difficult to mount tire and a wheel, disposed in an elevated position on said base 10, and comprises at least three radially outwardly extending arms 15, a plurality of hook-shaped notches 16' in the upper surfaces of two of the arms and opening upwardly to define hooks directed towards the center of the table. In addition, a plurality of rim clamps 49, each comprising a pair of spaced plates 15' with aligned hook formations 16 adapted to engage the rim of a wheel placed on the table are provided on base 10. The spaced plates 15' are interconnected by two spaced rods 46, and are spaced sufficiently so as to straddle a corresponding arm 15 with one of the rods 46 received in a selected one of the notches 16' and the other of the rods 46 in substantial abutment with the upper surface of the corresponding arm in a position opening towards the center of the table 41 and at a location generally radially outwardly with respect to the arm of the pin (not shown) receivable in a notch 16'. At least two of the clamps 49 are removably received respectively on one of the two arms 15, while clamps 49 for movement are situated in a generally radial path on the third arm 15. The operator is provided for selectively positioning the aforementioned clamp 49 along the path of movement to facilitate adjustment when a wheel is placed on table 41. In addition, as shown in FIG. 6, the operator will manipulate control pedals 26 and 26' in order to operate rotating means 45 which rotates table 41 and any accompanying wheel and difficult to mount tire secured thereon.

According to one embodiment, an operator is provided for adjusting such that one of the clamps is manually operated, while according to another embodiment, the operator is powered (i.e., automatic). The invention also contemplates the mounting of a manually operated bead loosening tool 25 on the base 10 (FIG. 1), and in another, a powered bead loosening tool (not shown).

Additionally, in a preferred embodiment, a swingable arm overlying the table is provided in such a way that it may slidably mount a post to be used as a fulcrum point for a tire servicing tool in the course of mounting and demounting tires.

Figure 2:
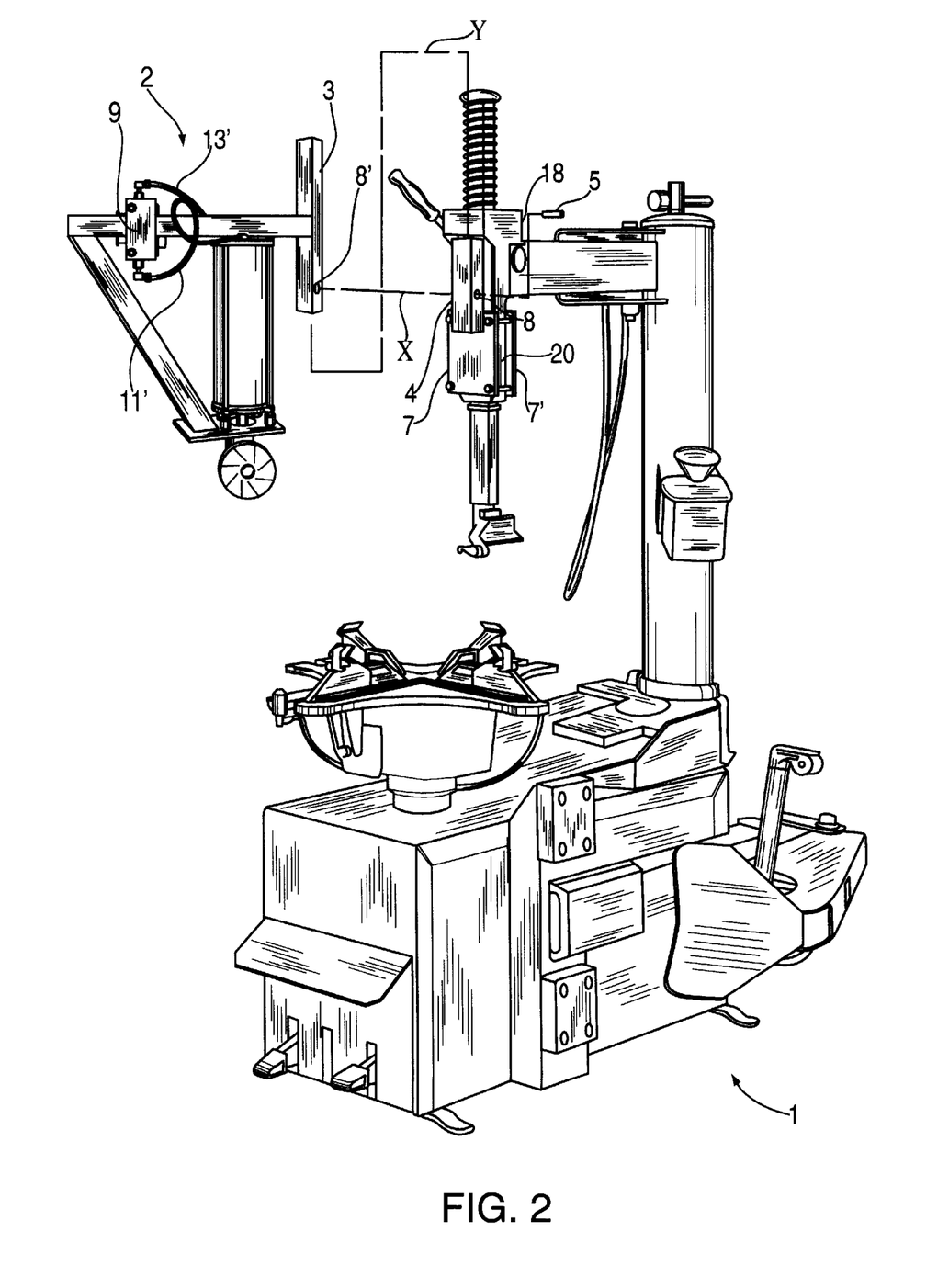
FIG. 2 is an offset frontal perspective view of a prior art machine with a retrofit-type apparatus in the pre-attached position from a prior art swing arm style tire changer machine.

As best illustrated in FIG. 2, is a prior art swing arm style tire changing machine 1 and a retrofit apparatus 2 of the invention, in the uninstalled position prior to attachment to the swing arm tire changing machine. Although the present invention contemplates several different methods of attachment, in the preferred embodiment the retrofit apparatus 2 is attached along dotted position line y which represents the approximate path of insertion of insertion bracket 3 of retrofit apparatus 2 into insertion bracket receptor 4, the two of which are adapted to cooperatively fit with each other and are preferably secured by a securing means such as pin 5. Insertion bracket receptor 4 may be fastened to tool assembly 20 according to any existing means as known in the art, but in the preferred embodiment, is secured to tool assembly 20 via opposing bolted plates 7 and 7'. Once the insertion bracket 3 and insertion bracket receptor 4 are cooperatively situated, a securing pin 5 may further be inserted along path x as a securing means to prevent unwanted movement between the retrofit apparatus 2 and the arm 18 by insertion through cooperative pin holes 8 and 8'. Also, as shown in FIG. 3, completed attachment of the preferred embodiment is therefore seen in the depiction of retrofit apparatus 2 properly secured by insertion of insertion bracket 3 into insertion bracket receptor 4, wherein securing pin 5 has been fully inserted in order to prevent any unwanted movement between insertion bracket 3 and insertion bracket receptor 4.

Figure 3:
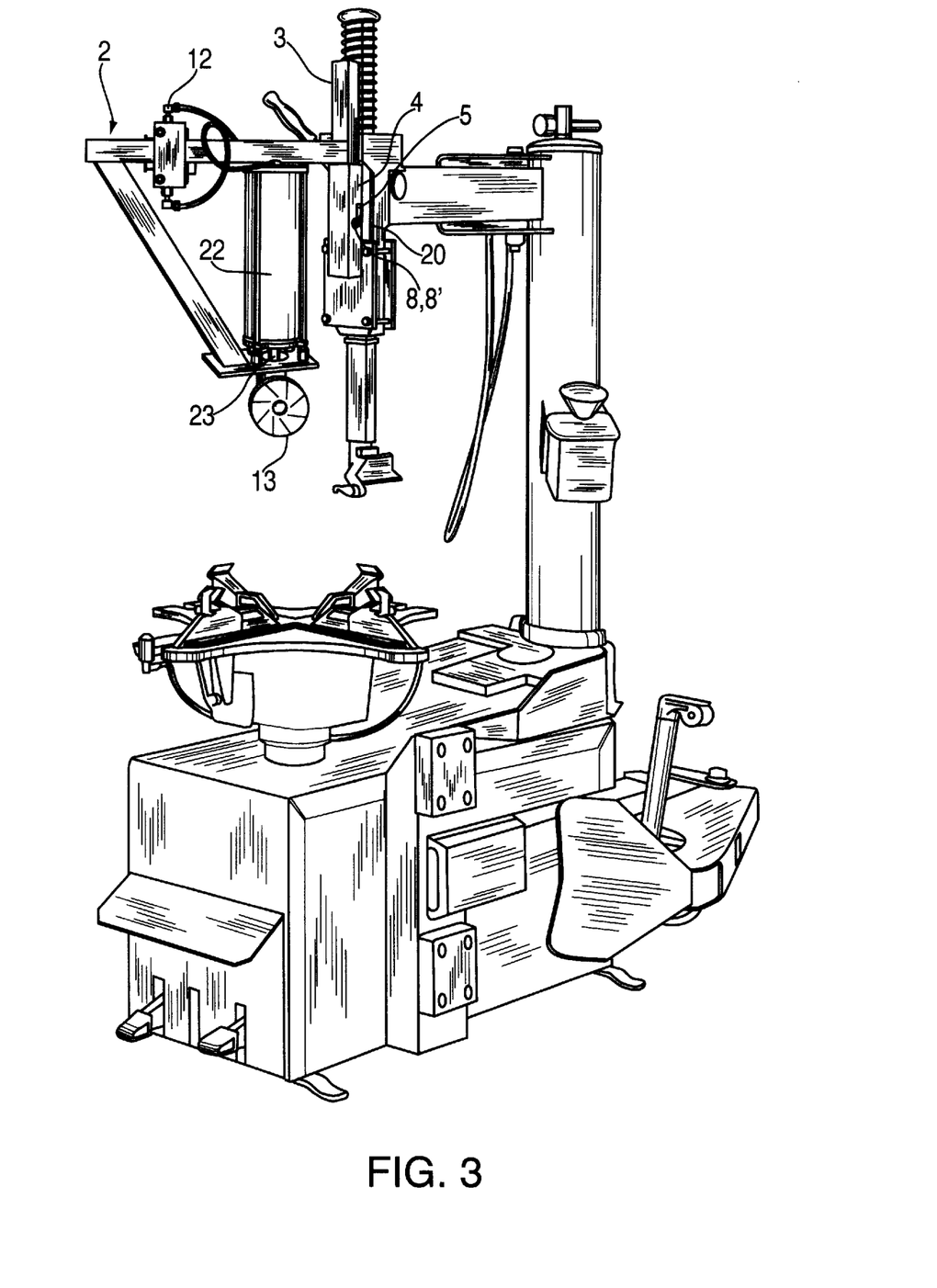
FIG. 3 is an offset frontal perspective view of a prior art machine with a retrofit apparatus in the attached position on the prior art swing arm style machine.

Thus, FIGS. 2 and 3 illustrate a preferred embodiment where, in lieu of wholesale replacement of a prior art machines, one can simply augment an existing machine with an adapter (i.e., retrofit apparatus 2) so as to make existing machines more capable of processing difficult to mount tires without damaging the rim of the wheel on which the tire is mounted.

Figure 4:
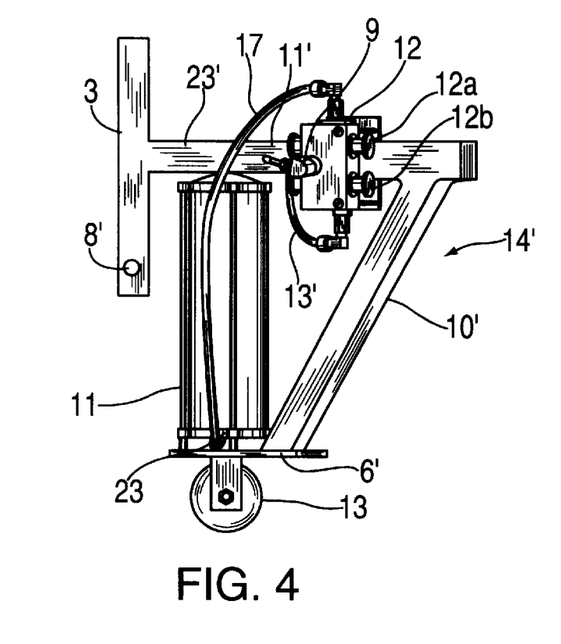
FIG. 4 is a side perspective view of the retrofit apparatus separate from the prior art swing arm style tire changing machine.

With reference to FIG. 4, the embodiment of retrofit apparatus 2, shown in FIGS. 2 and 3, will allow prior art swing arm machines not capable of mounting or demounting difficult to mount tires when retrofit apparatus is connected to tool assembly 20 as shown in FIG. 3. Alternatively, in another embodiment, such as where one is not concerned with retrofitting an existing machine, the analogue to retrofit apparatus 2 (not pictured), may be made integral as a part of tool assembly 20. In other words, in an alternative preferred embodiment, the tire changing device will be a part of an OEM tire changing machine rather than a retrofit adapter. Such an apparatus is also within the scope of the present invention.

Whether embodied as a retrofit attachment or embodied as an integral feature of an OEM tire changing machine, both embodiments of the tire changing device of the present invention are comprised of (as seen in FIG. 4), inter alia, a force means 11, controlled by operation control means 12, which cooperate together so as to apply force via rolling means 13, attached thereon to shaft 23. In an especially preferred embodiment, as pictured in FIG. 4, the force means constitutes either a pneumatic or hydraulic cylinder for applying vertical force to a substantially horizontal tire side wall 14 (shown in FIG. 6) via, preferably a roller 13 having an axis of rotation 17' parallel to said tire side wall 14. When force means 11 is a pneumatically pressurized cylinder, operation control means 12 will permit said roller to come into contact with said tire side wall 14 to depress the side wall to effectuate the difficult to mount tire mounting or demounting operation. The force means 11 is mounted on a supporting frame 14' which comprises an upper horizontal arm 11', a side bar 10', and a base member 6' which are connected to the exterior of force means 11.

Also in an especially preferred embodiment, the operation control means 12 is a pneumatic valve system which, although it can be controlled by various automatic means as known in the art, is preferably controlled manually by an operator 21 (FIG. 6) operating control buttons 12a and 12b (FIG. 4), which are connected to an internal valve setup (not shown) in control means 12. Control means 12 pressurizes line 17 to raise roller 13, while line 13' lowers roller 13. All pressure is preferably supplied via main pressure line 9 which connects to a pneumatic pressurizer (not shown) In an especially preferred embodiment, roller 13 is rotably attached via horizontal axle 19 at the bottom portion of shaft 23 (FIG. 6) which is attached to a lower end of shaft 23 of force means 11.

Figure 5:
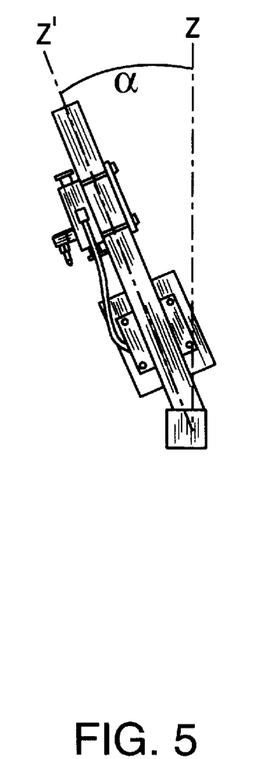
FIG. 5 is a top perspective view of the retrofit apparatus separate from the prior art swing arm style tire changing machine.
Figure 7:
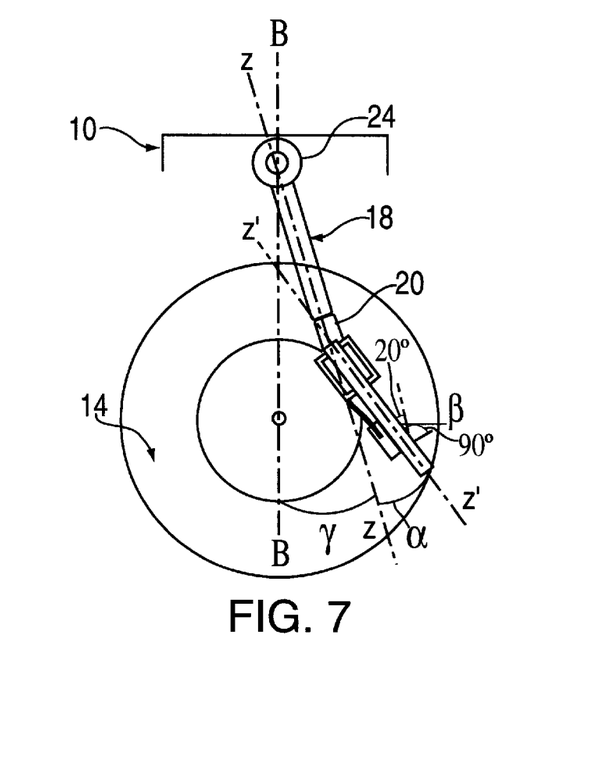
FIG. 7 is a top view schematic outline of a subject tire and the range of motion of the apparatus on said tire when the disclosed method is used therewith.

Depicted in FIGS. 5 and 7 is the overhead view of retrofit adapter 2 seen previously in FIGS. 2 and 3, and the corresponding equivalent tire changing apparatus extension of the OEM tire changing machine embodiment seen in FIG. 7, supra ("hereinafter collectively referred to as "the device"). In either of these two preferred embodiments, the device will have an offset angle α of approximately 10° to 40°, and preferably about 20° as it extends horizontally and outwardly from line z of swing arm 18 to z', wherein line z is offset by angle γ from base line B. In a particularly preferred embodiment, angle γ is usually about 15°–30° between lines z and B in order to locate the roller about ¼"–½" away from the rim of the wheel so as to accommodate wheel sizes such as 14", 18", etc. As a result of the above, roller 13, will be situated from approximately 4"–8", but preferably 6", from the head 26.

FIG. 7 is a top schematic view of the device, mounted on a swing arm 18 representing the tire changer in position for working contact with tire sidewall 14, with dotted line z', and z showing the offset angle α, while angle β, depicted as measured in relation from line z', is defined as the range of workable angles at which shaft 23 can be rotated before roller 13 is placed in contact with tire wall 14 to apply the requisite force in difficult to mount tire changing operations. While angle β may vary from 20° to 90°, in the preferred embodiment, the angle β is preferably approximately 50°.

Thus, with reference to FIG. 6, a human operator 21 is shown guiding the tire 27 as roller 13 contacts the tire wall 14. Operation control means 12 and associated air lines 17 and 13' are omitted from FIG. 6 for clarity. This embodiment of force means 11 utilizes a modified version 41 of supporting frame 14' of retrofit attachment 2, attached via a simplified mounting bracket 4'. Generally speaking, difficult to mount tires such as run-flat tires, extended mobility tires, zero pressure tires and extremely low profile tires all require more force than standard (i.e., so-called "soft wall" tires), and as such, the provision of the appropriate force to tire side walls via components such as roller 13 constitutes a significant improvement over "traditional" tire changing machines such as those disclosed in U.S. Pat. Nos. 4,196,766 and 4,417,614 which do not offer a means for effectuating the required force in difficult to mount tire side walls. Hence, whether determined according to an individual operator's experience, such as when utilizing manual operation means, or whether automatically determined as known in the art of pressure control systems, an effective force will be applied to the respective side wall. Such differences in the application of force may be adapted to accommodate the amount of force required by a particular type of tire (i.e, run-flat tires, extended mobility tires, zero pressure tires and extremely low profile tires) as well as according to the particular processing required (i.e., mounting, demounting, bead breaking, etc.). Generally speaking, however, difficult to mount tires will require the application of a force in the range of 100 to 400 pounds by roller 13.

Regarding the specific method of operation of the tire changing structure, as seen in FIG. 6, a difficult to mount tire such as tire 27, on a wheel 34, is such that when both are in a generally horizontal position, the wheel 34 will be clamped via clamps 11 (not pictured in FIG. 7) onto the base 10 (also not pictured in FIG. 7) of the swing arm style tire changer. As seen in FIG. 7, the difficult to mount tire and wheel, once clamped in such a manner, will have one tire wall side thereof exposed to tool assembly 20. Specifically, the force exerted on said side wall 14 will be applied from two points stemming from tool assembly 20; the roller 13 and head 26. Each point of force provides different purposes; the purpose of the roller 13 is, as mentioned above, to apply the requisite force on side walls of difficult to mount tires, while head 26 may be used to break the bead of such tires in demounting operations, etc. Processing of bead loosening and mounting/demounting operations may utilize head 26 (in conjunction with bead loosening tool 25) which is inserted between the wheel 34 and tire side wall 14 once force means have been perpendicularly applied to the side wall 14 via roller 13. To this end, both points of force are accompanied by the action of rotating means 45 of base 10 (as shown in FIG. 1), connected to a table 41 (shown in FIG. 1) for supporting a wheel 34 and tire 27, which is rotated, together with wheel 34 and tire 27 by rotating means 45 so as to effect bead loosening and pressure application in a circular path along the inner circumference c (FIG. 7) where the tire side wall 14 of tire 27 and wheel 34 meet.

The advantages of this structure and method are particularly relevant when contrasted with prior art difficult to mount tire changing machines which utilize a different angle than that disclosed in the range of angles α and β, as well as the fact that prior art difficult to mount tire changing machines utilize rolling means which have a potential for damaging tire walls of difficult to mount tires. More specifically, prior art tire changing machines such as those manufactured by Corghi Industries, utilize an obliquely angled rolling means as a bead breaker element which has a sharp profile which is in contact with the tire (i.e., rolling means) at angles significantly different than those in which the present invention operates. Unlike the present invention, which uses a roller 13 which is a cylindrical member with an arcuate engaging surface, as shown in FIG. 2, which contacts tire side wall 14 (not shown) to apply force to the tire side wall 14 in a manner which is different than the prior art. The surface of the roller which contacts the side wall should be from ¾" to 1½" in width and should present an essentially horizontal tangent to the surface of the side wall as it rotates. The use of a roller of this type reduces the possibility of damaging tire side walls which may happen when a roller with a sharp profile is applied to a tire side wall with force.

The foregoing description of a preferred embodiment of the invention has been presented for purposes of illustration and description. It is not intended to be exhaustive or to limit the invention to the precise form disclosed. Obvious modifications or variations are possible in light of the above teachings. All such obvious modifications and variations are intended to be within the scope of the appended claims.

I claim:

1. A difficult to mount tire changing machine for use in mounting and demounting difficult to mount tires on wheels, wherein said tire changing apparatus comprises:

a swing arm style tire changer having a base, an elongated upright stem extending from said base, a swing arm rotatively attached to said elongated stem, a tool assembly attachment to said swing arm, said tool assembly being movable downwardly and a means for rotation of said difficult to mount tires on wheels;

wherein said swing arm includes a difficult to mount tire changing device;

wherein said difficult to mount tire changing device comprises a force means for applying a force downwardly to a side wall of said difficult to mount tires via a roller means mounted on a shaft said roller means being capable of applying a force to a tire wall from said swing arm; said tool assembly and said force means being capable of being movable downwardly independently of one another and wherein said difficult to mount tire changing device further comprises a control means for controlling said force to said side wall from said swing arm.

2. A difficult to mount vehicle tire changing machine as defined in claim 1 wherein said force means comprises a pneumatically pressurized cylinder for applying said force to said side wall.

3. A difficult to mount vehicle tire changing machine as defined in claim 2 wherein said force means comprises a force activated shaft attached to said cylinder, said shaft having a first and a second end, wherein the first end of said force activated shaft is connected to said force means of said difficult to mount tire changing device, and wherein the second end of said pressure activated shaft is said roller for facilitating the effecting of force on said side wall during movement of said difficult to mount tire.

4. A difficult to mount tire changing machine as defined in claim 1 wherein the difficult to mount tire changing device is a retrofit attachment means for attaching to a swing arm type tire changer.

5. A difficult to mount tire changing device as defined in claim 1 wherein the difficult to mount tire changing device is a device integral with the tool assembly of said swing arm tire changing machine.

6. A difficult to mount tire changing device defined in claim 4 wherein the retrofit attachment means comprises a bolt-on insertion bracket receptor for attachment on said tool assembly of said swing arm tire changing machine and wherein said difficult to mount tire changing apparatus includes an insertion bracket for secure interconnection with said insertion bracket receptor.

7. A difficult to mount tire changing machine for use in mounting and demounting difficult to mount tires on wheels, wherein said tire changing apparatus comprises:

a swing arm style tire changer having a base, an elongated upright stem extending from said base, a swing arm rotatively attached to said elongated stem, a tool assembly attachment to said swing arm, said tool assembly being movable downwardly and a means for rotation of said difficult to mount tires on wheels;

wherein said swing arm includes a difficult to mount tire changing device;

wherein said difficult to mount tire changing device comprises a force means for applying a force downwardly to a side wall of said difficult to mount tires via a contact means mounted on a shaft said contact means being capable of applying a force to a tire wall from said swing arm; said tool assembly and said force means being capable of being movable downwardly independently of one another and wherein said difficult to mount tire changing device further comprises a control means for controlling said force to said side wall from said swing arm wherein said contact means of said difficult to mount tire machine is comprised of a contact means having a substantially flat profile with which to contact the side wall of a difficult to mount vehicle tire.

8. A difficult to mount vehicle tire changing machine as defined in claim 7, wherein said swing arm of said difficult to mount tire changer has a swing line from a base line, and wherein said swing line of said swing arm is from 15° to 30° from said base line.

9. A difficult to mount vehicle tire changing machine as defined in claim 8, wherein the difficult to mount tire device has a device offset angle from said swing line of said swing arm, wherein said device offset angle is from 10° to 40° from said swing line of said swing arm.

10. A difficult to mount vehicle tire changing machine as defined in claim 9, wherein said difficult to mount tire device has a device offset angle of 20° from said swing line.

11. A difficult to mount vehicle tire changing machine as defined in claim 9 or 10, wherein said roller of said difficult to mount tire device has a roller offset from 20° to 90° from said device offset angle of said difficult to mount tire device.

12. A difficult to mount vehicle tire changing machine as defined in claim 11, wherein said contact wheel of said difficult to mount tire device has a wheel offset of 50° from said device offset angle of said difficult to mount tire device.

13. A method for mounting difficult to mount tires, said method comprising the steps of:

(a) orienting a wheel on a base of a swing arm style tire changer (b) securing a center portion of said wheel to said base;

(c) placing said difficult to mount tire on said wheel;

(d) effecting a downward force from a roller mounted on an extension on said a swing arm style tire changer that contacts a side wall of said difficult to mount tire;

applying a force from a tire engaging head which is movable downwardly on said a swing arm style tire changer to a bead on said tire, said roller mounted on a swing arm and said tire engaging head being capable of being moved downwardly independent of one another; and (f) rotating said wheel and difficult to mount tire relative to said base so as to effect application of said force said side wall from said tire engaging head and said force from said roller.

14. A process as defined in claim 13, wherein said force from said difficult to mount tire device is effected perpendicularly to said side wall of said difficult to mount tire.

15. A process as defined in claim 13, wherein in step (a) said swing arm of said difficult to mount tire device is situated at a swing line from a base line, and wherein said swing line of said swing arm is from 15° to 30° from said base line.

16. A process as defined in claim 13, wherein in step (a) said difficult to mount tire device has a device offset angle from said swing arm, wherein said device offset angle is from 10° to 40° from said swing line of said swing arm.

17. A difficult to mount tire changing machine which is a retrofit attachment for a swing arm tire changing machine, said tire changing device comprising;

a support frame;

a force means for applying a force to a tire side wall wherein said force means comprises a roller mounted on a shaft, said force means being independently adjustable in a downward direction with regard to the tool assembly of a swing arm tire changing machine; and an operation control means for controlling said force means.

* * * * *